US012749327B2

(12) United States Patent
Wang et al.

(10) Patent No.: US 12,749,327 B2
(45) Date of Patent: Sep. 29, 2026

(54) OBJECT DETECTION METHOD AND APPARATUS, AND COMPUTER-READABLE STORAGE MEDIUM AND UNMANNED VEHICLE

(71) Applicant: BEIJING JINGDONG QIANSHI TECHNOLOGY CO., LTD., Beijing (CN)

(72) Inventors: Dan Wang, Beijing (CN); Hao Liu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 18/839,348

(22) PCT Filed: Dec. 5, 2022

(86) PCT No.: PCT/CN2022/136555
§ 371 (c)(1),
(2) Date: Aug. 16, 2024

(87) PCT Pub. No.: WO2023/185069
PCT Pub. Date: Oct. 5, 2023

(65) Prior Publication Data

US 2025/0157236 A1 May 15, 2025

(30) Foreign Application Priority Data

Apr. 1, 2022 (CN) ......................... 202210339110.5

(51) Int. Cl.
*G06V 20/70* (2022.01)
*G06T 5/50* (2006.01)
*G06V 20/58* (2022.01)

(52) U.S. Cl.
CPC ................ *G06V 20/70* (2022.01); *G06T 5/50* (2013.01); *G06V 20/58* (2022.01); *G06V 2201/07* (2022.01)

(58) Field of Classification Search
CPC ........................................................ G06T 5/50
See application file for complete search history.

(56) References Cited

U.S. PATENT DOCUMENTS

2014/0192050 A1* 7/2014 Qiu ...................... G06V 20/653
345/420
2021/0146952 A1* 5/2021 Vora ..................... G06N 3/0495
(Continued)

FOREIGN PATENT DOCUMENTS

CN 109597087 A 4/2019
CN 110032962 A 7/2019
(Continued)

OTHER PUBLICATIONS

"International Search Report and Written Opinion of the International Search Report with English language translation", International Application No. PCT/CN2022/136555, Feb. 27, 2023, 11 pp.
(Continued)

*Primary Examiner* — Edward Park
(74) *Attorney, Agent, or Firm* — Myers Bigel, P.A.

(57) ABSTRACT

The present disclosure relates to an object detection method and apparatus, and a computer-readable storage medium and an unmanned vehicle. The object detection method includes acquiring an original point cloud of an object to be detected, an image of the object, and a semantic label of a pixel point in the image; generating a candidate detection box of the object according to the original point cloud; generating a virtual point cloud according to the candidate detection box; fusing the original point cloud with the virtual point cloud, to obtain a fused point cloud; determining a semantic label corresponding to each point in the fused point cloud by
(Continued)

projecting the fused point cloud into an image coordinate system; and generating a three-dimensional detection box of the object by a three-dimensional detection model according to the fused point cloud and the semantic label corresponding to each point in the fused point cloud.

19 Claims, 4 Drawing Sheets

(56) References Cited

U.S. PATENT DOCUMENTS

| | | | | |
|---|---|---|---|---|
| 2021/0209806 | A1* | 7/2021 | Oh | G06T 19/00 |
| 2022/0189070 | A1* | 6/2022 | Rejeb Sfar | G06N 3/088 |

FOREIGN PATENT DOCUMENTS

| | | | |
|---|---|---|---|
| CN | 111209840 | A | 5/2020 |
| CN | 112101092 | A | 12/2020 |
| CN | 113139602 | A | 7/2021 |
| CN | 113781653 | A | 12/2021 |
| CN | 114119992 | A | 3/2022 |

OTHER PUBLICATIONS

Chen, Xiaozhi , et al., "Multi-View 3D Object Detection Network for Autonomous Driving", 2017 IEEE Conference on Computer Vision and Pattern Recognition (CVPR), Honolulu, HI, USA, Jul. 21, 2017, pp. 6526-6534.

Ku, Jason , et al., "Joint 3D Proposal Generation and Object Detection from View Aggregation", e-print: arXiv:1712.02294v4 [cs.CV], retrieved from https://arxiv.org/abs/1712.02294, Jul. 12, 2018, 8 pp.

Lang, Alex H., et al., "PointPillars: Fast Encoders for Object Detection from Point Clouds", e-print: arXiv:1812.05784v2 [cs. LG], retrieved from https://arxiv.org/abs/1812.05784, May 7, 2019, 9 pp.

Vora, Sourabh , "PointPainting: Sequential Fusion for 3D Object Detection", e-print: arXiv:1911.10150v2 [cs.CV], retrieved from https://arxiv.org/abs/1911.10150, May 6, 2020, 11 pp.

Xu, Shaoqing , et al., "FusionPainting: Multimodal Fusion with Adaptive Attention for 3D Object Detection", e-print: arXiv:2106.12449v2 [cs.CV], retrieved from https://arxiv.org/abs/2106.12449v2, Aug. 10, 2021, 8 pp.

Zhou, Yin , et al., "VoxelNet: End-to-End Learning for Point Cloud Based 3D Object Detection", 2018 IEEE/CVF Conference on Computer Vision and Pattern Recognition, Salt Lake City, UT, USA, Jun. 18, 2018, pp. 4490-4499.

First Examination Report Notification and English language translation, CN Application No. 202210339110.5, Mar. 24, 2025, 20 pp.

Communication with Supplementary European Search Report, EP Application No. 22934887.5, Nov. 14, 2025, 10 pp.

Huang, et al., "Multi-modal Sensor Fusion for Auto Driving Perception: A Survey", arXiv:2202.02703v2, Cornell University, Ithica XP093119443 [retrieved from https://arxiv.org/abs/2202.02703v2], Feb. 27, 2022, 14 pp.

Yin, et al., "Center-based 3D Object Detection and Tracking", arXiv:2006.11275v2, Cornell University Library, 201 Olin Library Cornell University, Ithaca, NY 14853, XP081852707 [retrieved from https://arxiv.org/abs/2006.11275v2], Jan. 6, 2021, 12 pp.

Yin, et al., "Multimodal Virtual Point 3D Detection", arXiv:2111.06881v1, Cornell University Library, 201 Olin Library, Cornell University, Ithaca, NY 14853, XP091098884 [retrieved from https://arxiv.org/abs/2111.06881v1], Nov. 12, 2021, 14 pp.

* cited by examiner

OBJECT DETECTION METHOD AND APPARATUS, AND COMPUTER-READABLE STORAGE MEDIUM AND UNMANNED VEHICLE

CROSS-REFERENCE TO RELATED APPLICATIONS

This application is a U.S. National Stage Application under 35 U.S.C. § 371 of International Application No. PCT/CN2022/136555, filed on Dec. 5, 2022, which itself is based on and claims the benefit of priority to the CN application No. 202210339110.5 filed on Apr. 1, 2022, which are hereby incorporated by reference in their entireties into the present application.

TECHNICAL FIELD

The present disclosure relates to the field of artificial intelligence, in particular to the field of automatic driving, and in particular relates to an object detection method and apparatus, a computer-readable storage medium and an unmanned vehicle.

BACKGROUND

With the introduction of convolutional neural network into the field of target detection, 2D target detection has become a research hotspot, and various new methods are constantly emerging. However, in application scenes of unmanned driving, robot and augmented reality, ordinary 2D target detection cannot provide all the information needed to perceive the environment, and 2D target detection can only provide the position and corresponding category of the target object in a 2D image.

But in the real 3D world, all objects have 3D shapes. For example, in the scene of autonomous driving, autonomous vehicles must detect and identify obstacles that may hinder driving, and need information such as the length, width and height of the target object in order to make reasonable avoidance actions according to different types and states of obstacles. Therefore, 3D target detection plays an important role in path planning and control.

At present, imaging results of monocular camera, binocular camera and lidar are mainly used to detect 3D objects in the environment.

SUMMARY

According to a first aspect of the present disclosure, there is provided an object detection method, comprising:

- obtaining an original point cloud of an object to be detected, an image of the object to be detected, and semantic labels of pixels in the image;
- generating a candidate detection box for the object to be detected according to the original point cloud;
- generating a virtual point cloud according to the candidate detection box;
- fusing the original point cloud and the virtual point cloud to obtain a fused point cloud;
- determining a semantic label corresponding to each point in the fused point cloud by projecting the fused point cloud onto an image coordinate system; and
- generating a 3D detection box for the object to be detected by using a 3D detection model according to the fused point cloud and the semantic label corresponding to each point in the fused point cloud.

In some embodiments, the generating a virtual point cloud according to the candidate detection box, comprises:

- generating a grid of the candidate detection box; and
- generating the virtual point cloud according to the grid of the candidate detection box.

In some embodiments, each point in the virtual point cloud corresponds to one grid of the candidate detection box, and the virtual point cloud has a density greater than the original point cloud.

In some embodiments, the determining a semantic label corresponding to each point in the fused point cloud by projecting the fused point cloud onto the image coordinate system, comprises: determining a correspondence between each point in the fused point cloud and each pixel in the image by projecting the fused point cloud onto the image coordinate system; and

- determining a semantic label corresponding to each point in the fused point cloud, according to the correspondence between each point in the fused point cloud and each pixel in the image, and the semantic label of each pixel in the image.

In some embodiments, the fusing the original point cloud and the virtual point cloud to obtain a fused point cloud, comprises: superimposing the original point cloud with the virtual point cloud to obtain the fused point cloud.

In some embodiments, the generating a 3D detection box for the object to be detected by using a 3D detection model according to the fused point cloud and the semantic label corresponding to each point in the fused point cloud, comprises:

- concatenating coordinates of each point in the fused point cloud with the semantic label of the point, to obtain fused information of the point cloud and the image; and
- generating the 3D detection box by using the 3D detection model according to the fused information of the point cloud and the image.

In some embodiments, the concatenating the coordinates of each point in the fused point cloud with the semantic label of the point to obtain fused information of the point cloud and the image, comprises: connecting in series the coordinates of each point in the fused point cloud and the semantic label of the point into an array as the fused information of the point cloud and the image.

In some embodiments, the 3D detection model comprises a first feature extraction network and a first detection network, the generating a 3D detection box for the object to be detected by using a 3D detection model, according to the fused information of point cloud and image, comprises:

- extracting features of the fused information of the point cloud and image by using the first feature extraction network; and generating the 3D detection box for the object to be detected by using the first detection network, according to the features of the fused information of the point cloud and image.

In some embodiments, the semantic label of a pixel in the image is a category of each pixel generated by semantic segmentation of the image.

In some embodiments, the original point cloud of the object to be detected is obtained by scanning the object to be detected with a lidar, and the image of the object to be detected is obtained by shooting the object to be detected with a camera.

In some embodiments, the generating a candidate detection box for the object to be detected according to the original point cloud, comprises:

- extracting features of the original point cloud by using a second feature extraction network; and generating the candidate detection box of the object to be detected by using a second detection network, according to the features of the original point cloud.

According to a second aspect of the present disclosure, there is provided an object detection apparatus, comprising:

an obtaining module configured for obtaining an original point cloud of an object to be detected, an image of the object to be detected, and semantic labels of pixels in the image;

a candidate detection box generating module configured for generating a candidate detection box of the object to be detected according to the original point cloud;

a virtual point cloud generating module configured for generating a virtual point cloud according to the candidate detection box;

a point cloud fusing module configured for fusing the original point cloud with the virtual point cloud to obtain a fused point cloud;

a determining module configured for determining a semantic label corresponding to each point in the fused point cloud by projecting the fused point cloud onto an image coordinate system; and a 3D detection box generating module configured for generating a 3D detection box for the object to be detected by using a 3D detection model according to the fused point cloud and the semantic label corresponding to each point in the fused point cloud.

According to a third aspect of the present disclosure, there is provided an object detection apparatus, comprising:

a memory; and a processor coupled to the memory, the processor being configured to implement the object detection method according to any embodiment of the present disclosure based on an instruction stored in the memory.

According to a fourth aspect of the present disclosure, there is provided a computer-readable storage medium, on which a computer program instruction is stored, and the computer program instruction, when executed by a processor, implements the object detection method according to any embodiment of the present disclosure.

According to a fifth aspect of the present disclosure, there is provided an unmanned vehicle equipped with the object detection apparatus according to any embodiment of the present disclosure.

BRIEF DESCRIPTION OF THE DRAWINGS

The accompanying drawings, which form part of the description, illustrate embodiments of the present disclosure and together with the description, serve to explain principles of the present disclosure.

The present disclosure can be more clearly understood from the following detailed description with reference to the accompanying drawings, wherein.

DETAILED DESCRIPTION

Figure 1:
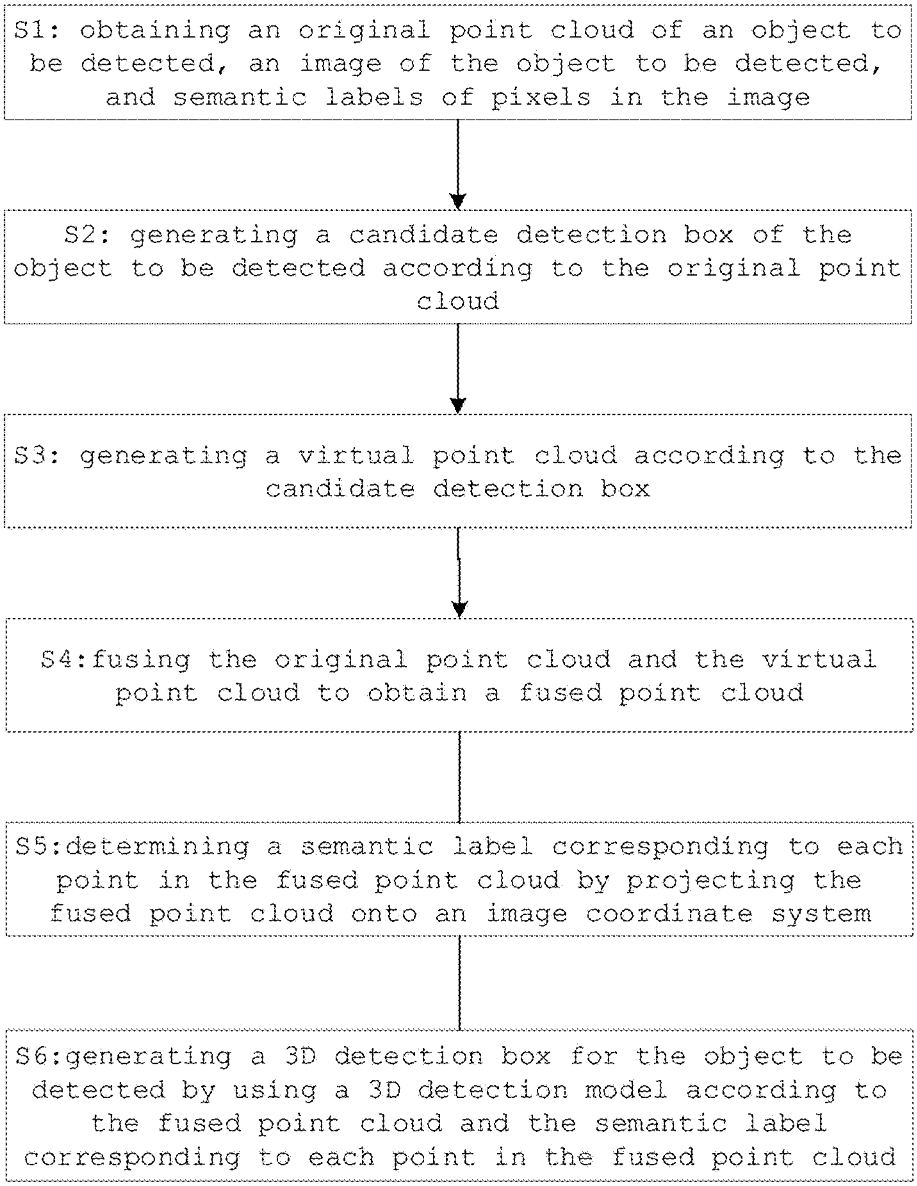
FIG. 1 shows a flowchart of an object detection method according to some embodiments of the present disclosure.

Various exemplary embodiments of the present disclosure will now be described in detail with reference to the accompanying drawings. It should be noted that, unless otherwise specified, elements and arrangement of steps relative to one another, numeric expressions and values recited in these embodiments do not restrict the scope of the present disclosure.

Besides, it should be understood that, in order to facilitate illustration, dimensions of elements shown in the drawings are not given according to the actual scaling relation.

The below description of at least one exemplary embodiment is actually only illustrative, and should by no means be taken as any restriction over the present disclosure and its application or use.

For technology, process and apparatus already known by a person skilled in the related art, detailed discussion may not be given, but if appropriate, such technology, process and apparatus should be regarded as part of the description.

In any example shown or discussed here, any specific value should be interpreted only as being exemplary, rather than being restrictive. Thus, other examples of exemplary embodiments may have different values.

It should be noted that, as like reference signs in the below figures denote like elements, once an element is defined in a figure, it does not need to make further discussion for it in a subsequent figure.

Among related technologies, there are mainly two kinds of algorithms for 3D target detection. The first algorithm is to fuse the original 3D point cloud data with the original 2D image data, so that the fused data has both RGB information and 3D information, and then use a detector to detect the fused data and output the detection results. But there are several problems with this algorithm. Firstly, since the imaging mode of point cloud and the imaging mode of image are carried out from different perspectives, it is difficult to align point cloud data and image data when they are fused. Secondly, this algorithm needs to use two models to extract features from data of different sensors, and then carry out fusion detection, which increases the complexity of the algorithm. Finally, due to the sparsity of radar data and the density of image data, the fusion result of the two is not ideal, which is difficult to be used for effective feature learning and reduces the accuracy of target detection.

In order to solve the above problems, the present disclosure proposes an object detection method and apparatus, a computer-readable storage medium and an unmanned vehicle. The present disclosure can solve the alignment problem between a 3D point cloud and a 2D image by projecting the point cloud onto an image coordinate system to determine the correspondence between the point in the point cloud and the semantic label of each point in the 2D image coordinate system.

Besides, the present disclosure uses a 3D detection model to generate a 3D detection box for the object to be detected according to the fused point cloud and the semantic label corresponding to each point in the fused point cloud. On one hand, only one 3D detection model is used, reducing the complexity of the model and facilitating deployment to the vehicle end. On the other hand, in the final data used for object detection, both the depth information of the 3D point cloud and the semantic label information of the 2D image are retained, which provides more information for the 3D detection model and can improve the accuracy of 3D object detection.

FIG. 1 shows a flowchart of an object detection method according to some embodiments of the present disclosure. In some embodiments, the following image restoration methods are performed by an object detection device.

As shown in FIG. 1, the object detection method comprises steps S1 to S6. Step S1 comprises obtaining an original point cloud of an object to be detected, an image of the object to be detected, and semantic labels of pixels in the image.

For example, the original point cloud and image can be scanned respectively by different sensors for the same object. Sensors can be lidar, monocular camera, binocular camera, etc.

In some embodiments, the original point cloud of the object to be detected is obtained by scanning the object to be detected with a lidar, and the image of the object to be detected is obtained by shooting the object to be detected with a camera.

In some embodiments, the semantic label of a pixel in the image is a category of each pixel generated by semantic segmentation of the image.

For example, using a 2D semantic segmentation model, a 2D image is semantically segmented at the pixel level. Input of the model is color information of red, green, and blue channels of the image (RGB), and output thereof is the semantic category of each pixel. Thus, pixels belonging to the same category can be grouped together to obtain a label of each pixel's category. For example, classifying pixels belonging to humans into one category and classifying pixels belonging to cars into one category. Semantic labels may comprise, for example, "obstacle", "non-obstacle bicycle", "pedestrians", and "background".

Step S2 comprises generating a candidate detection box of the object to be detected according to the original point cloud.

In some embodiments, the generating a candidate detection box of the object to be detected according to the original point cloud, comprises: extracting features of the original point cloud by using a second feature extraction network; and generating the candidate detection box of the object to be detected by using a second detection network, according to the features of the original point cloud.

For example, a candidate detection box is firstly generated according to the point cloud. In particular, a voxelization operation to the original point cloud is performed by using a method such as PointPillar or VoxelNet, and then, a result of the voxelization operation is sent to a 3D backbone network for feature extraction. Finally, a proposal (3D detection box) is generated by using a detection head, according to the extracted features.

For example, a 3D target detection method based on BEV (bird's eye view) can be used to project a lidar point cloud on an X-Y coordinate plane, and a BEV feature map can be obtained after discretization. The BEV map presents the point cloud in the form of an image, while retaining a spatial relationship of obstacles in the 3D world. Then, based on this feature map, a candidate detection box is generated by using a detector.

Besides, the Non-Maximum Suppression (NMS) method can further be used to remove redundant 3D detection boxes to obtain the candidate detection box.

The present disclosure uses point cloud data to extract foreground spots of a possible candidate box. With such a method, information of the candidate box is fused with image data and then used for 3D object detection, which can reduce detection errors caused by inaccurate calibration parameters between different sensors.

Step S3 comprises generating a virtual point cloud according to the candidate detection box.

In some embodiments, the generating a virtual point cloud according to the candidate detection box, comprises generating a grid of the candidate detection box; and generating the virtual point cloud according to the grid of the candidate detection box.

For example, the virtual point cloud can be obtained by rasterizing the candidate detection box.

In some embodiments, each point in the virtual point cloud corresponds to one grid of the candidate detection box, and the virtual point cloud has a density greater than the original point cloud.

Figure 2A:
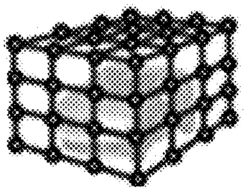
FIGS. 2A and 2B show schematic diagrams of virtual point cloud generation methods according to some embodiments of the present disclosure.
Figure 2B:
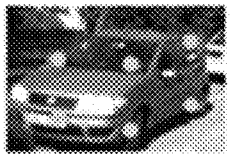

FIGS. 2A and 2B show schematic diagrams of virtual point cloud generation methods according to some embodiments of the present disclosure.

After obtaining the candidate detection boxes, each candidate detection box is rasterized, and as shown in FIG. 2A, the candidate detection box is divided into grids having an equal size, and then coordinates of each grid are taken as a virtual point, and the virtual point obtained is shown as a dot in FIG. 2B. Moreover, a density of the virtual point cloud can be greater than that of the original point cloud by adjusting the size of the grid.

Since the density of the virtual point cloud is greater than that of the original point cloud, the virtual point cloud also becomes dense, which solves the problem that a density difference between the image and the point cloud is too large and improves the accuracy of 3D target detection.

Step S4 comprises fusing the original point cloud and the virtual point cloud to obtain a fused point cloud.

In some embodiments, the fusing the original point cloud and the virtual point cloud to obtain a fused point cloud, comprises superimposing the original point cloud with the virtual point cloud to obtain the fused point cloud.

For example, since the point cloud is represented by coordinates, the coordinate points in the original point cloud and the coordinate points in the virtual point cloud are merged together to obtain a fused point cloud, and the density of the fused point cloud is greater than that of the original point cloud or the virtual point cloud. Moreover, there are no overlapping points in the obtained fused point cloud. The fused point cloud is "original point cloud+virtual point cloud". Fusing the original point cloud with the virtual point cloud to obtain a fused point cloud such that the fused point cloud has a density greater than that of the original point cloud, solves the problem of having too large density difference between the image and the point cloud. Besides, the virtual point cloud comprises information of the candidate detection box, which is equivalent to providing supervision information in the subsequent 3D detection process and improving the accuracy of 3D target detection of the object.

Step S5 comprises determining a semantic label corresponding to each point in the fused point cloud by projecting the fused point cloud onto an image coordinate system.

In some embodiments, the determining a semantic label corresponding to each point in the fused point cloud by projecting the fused point cloud onto the image coordinate system, comprises: determining a correspondence between each point in the fused point cloud and each pixel in the image by projecting the fused point cloud onto the image coordinate system; and determining a semantic label corresponding to each point in the fused point cloud, according to the correspondence between each point in the fused point cloud and each pixel in the image and the semantic label of each pixel in the image.

Figure 3:
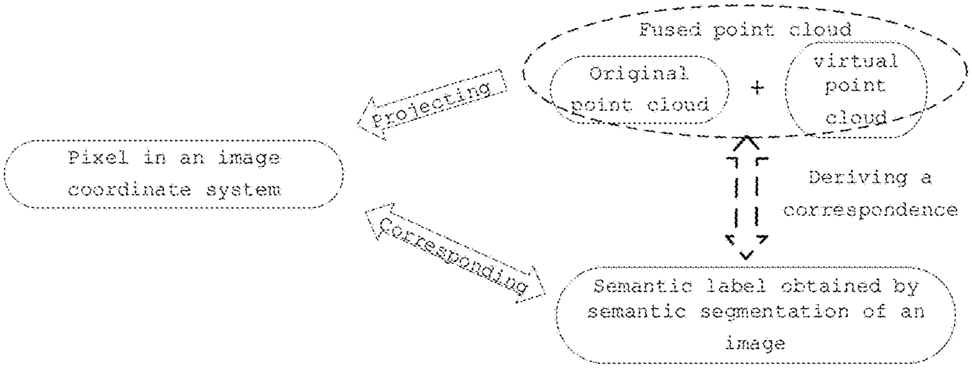
FIG. 3 shows a schematic diagram of determining semantic labels of points in a fused point cloud according to some embodiments of the present disclosure.

FIG. 3 shows a schematic diagram of determining semantic labels of points in a fused point cloud according to some embodiments of the present disclosure.

As shown in FIG. 3, the fused point cloud is firstly projected onto the image coordinate system by using camera calibration information, and the projection formula is as follows:

$$z_c\begin{bmatrix} u \\ v \end{bmatrix} = K[R \quad T]\begin{vmatrix} P_x \\ P_y \\ D \end{vmatrix}$$

wherein $P_x$, $P_y$ and $P_z$ respectively represent coordinates of the points in the fused point cloud in the image coordinate system, K represents an internal reference matrix of the camera, and R and T respectively represent a translation transformation matrix and a rotation transformation matrix from the point cloud coordinate system to the image coordinate system, these two transformation matrices being determined according to calibrated external parameters of the camera and the point cloud, $z_c$ represents image depth information, and u and v represent horizontal and vertical coordinates of the pixel in the image coordinate system after the point in the fused point cloud is projected onto the image coordinate system.

A correspondence between the 3D fused point cloud and the 2D image is obtained, according to the coordinates (u, v) obtained after the point in the fused point cloud is projected onto the image coordinate system. Corresponding the point in the fused point cloud with the pixel in the image, since the semantic label of the pixel in the image has been obtained in the step of image semantic segmentation, the correspondence between the point in the fused point cloud and the semantic label C of the pixel in the image can be derived, so that each point in the fused point cloud has a corresponding semantic label.

According to the present disclosure, the fused point cloud is projected onto an image by using a calibration equation, and the semantic label of each point of the fused point cloud is obtained through the projection of the fused point cloud in the image coordinate system, so that the points in the 3D point cloud are aligned with the semantic segmentation result of the 2D image, and the data alignment problem caused by the method of directly fusing the original point cloud data with the original RGB information of the 2D image is avoided.

Besides, compared with a method of drawing an image onto a point cloud, according to the present disclosure, the point cloud is projected onto an image coordinate system, so that a projection error caused by lack of image depth information is avoided. The purpose of projecting the point cloud onto the image in the present disclosure is to obtain the correspondence between the point cloud and the semantic label, and the semantic label and the point cloud coordinates in the 3D space are subsequently sent to the 3D detection model, instead of the projection coordinates of the point cloud in the image coordinate system. Therefore, the final data used for 3D detection comprises depth information of the point cloud, which improves the accuracy of detection.

Step S6 comprises generating a 3D detection box for the object to be detected by using a 3D detection model according to the fused point cloud and the semantic label corresponding to each point in the fused point cloud.

In some embodiments, the generating a 3D detection box for the object to be detected by using a 3D detection model according to the fused point cloud and the semantic label corresponding to each point in the fused point cloud, comprises: concatenating the coordinates of each point in the fused point cloud with the semantic label of the point to obtain fused information of the point cloud and the image; and generating the 3D detection box for the object to be detected by using the 3D detection model, according to the fused information of point cloud and image.

In some embodiments, the concatenating the coordinates of each point in the fused point cloud with the semantic label of the point to obtain fused information of the point cloud and the image, comprises: connecting in series the coordinates of each point in the fused point cloud and the semantic label of the point into an array as the fused information of the point cloud and the image.

For example, the fusion information can be obtained by concatenating (cat) the coordinates of the point in the fusion point cloud in the spatial coordinate system with the semantic label obtained in the image semantic segmentation, where the concatenating refers to concatenating along a certain dimension of the existing data, and the total dimension of the data remains unchanged after the operation. For example, concatenating the coordinates of each point in the fused point cloud with the semantic label of the point according to the following formula:

$$P_i = (P_x, P_y, P_z, C)$$

Wherein $P_i$ is fused information of each point, $(P_x, P_y, P_z)$ is coordinates of the point in the spatial coordinate system, and C is a semantic label of the point.

In some embodiments, the 3D detection model comprises a first feature extraction network and a first detection network, the generating a 3D detection box for the object to be detected by using a 3D detection model, according to the fused information of point cloud and image, comprises: extracting features of the fused information of the point cloud and image by using the first feature extraction network; and generating the 3D detection box for the object to be detected by using the first detection network, according to the features of the fused information of the point cloud and image.

The 3D detection model comprises a backbone network for feature extraction and a detection network for detection box generation. The method comprises using a common point cloud representation method (such as PointPillar, voxelNet, or the like), to process the fused information of point cloud and image into a data structure that can be learned by the network, and then using the feature extraction network (backbone network) to learn the fused information of the processed point cloud and image of two sensors, and finally, connecting a detection head of a detection task to generate a 3D detection box, and obtain the final 3D detection result.

Figure 4:
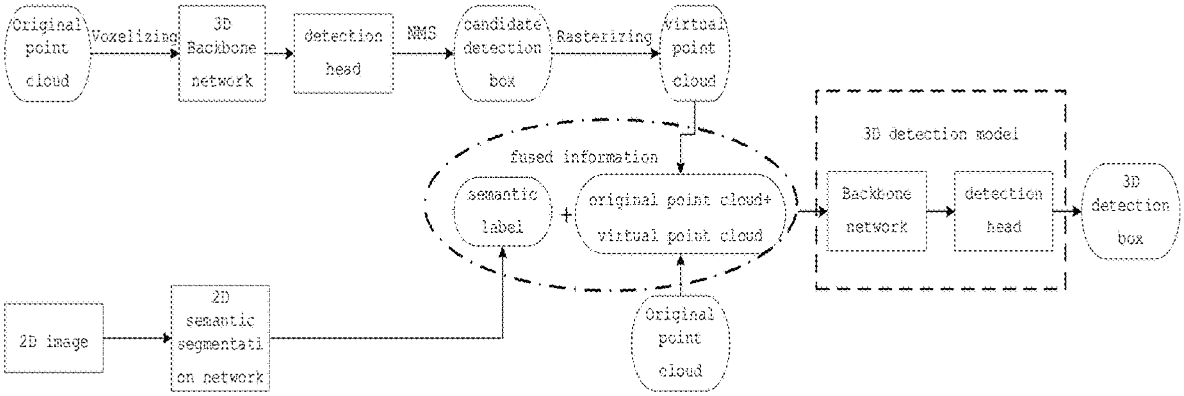
FIG. 4 shows a flowchart of generating a 3D detection box according to some other embodiments of the present disclosure.

FIG. 4 shows a flowchart of generating a 3D detection box according to some other embodiments of the present disclosure.

As shown in FIG. 4, steps of generating a 3D detection box are as follows: firstly, performing a voxelization operation to an original point cloud, sending a result of the voxelization operation to a 3D backbone network for feature extraction, and generating a proposal (3D detection box) by using a detection head, according to the extracted features; removing redundant 3D detection boxes to obtain a candidate detection box by using the Non-Maximum Suppression (NMS) method; obtaining a virtual point cloud by rasterizing the candidate detection box, and fusing the original point cloud with the virtual point cloud to obtain a fused point cloud; obtaining a semantic label by semantic segmentation of a 2D image; determining a semantic label corresponding to each point in the fused point cloud by projecting the fused point cloud onto an image coordinate system; concatenating coordinates of each point in the fused point cloud with the semantic label of the point to obtain fused information of the point cloud and the image; using a common point cloud representation method, to process the fused information of the point cloud and image into a data structure that can be learned by the network; using a feature extraction network (backbone network) to learn the fused information of the processed point cloud and image of two sensors; and finally, connecting a detection head of a detection task to generate a 3D detection box, and obtain the final 3D detection result.

In the present disclosure, combining the fused point cloud with the semantic information (semantic label) of the image, performing a basic coding operation, and accessing a 3D target detector to obtain the final detection result. In the final detection phase, only one 3D detection model is used to obtain a 3D detection result, which can reduce the complexity of the model and facilitate the deployment of the model in the vehicle.

Besides, according to the present disclosure, in the final data used for object detection, both the depth information of the 3D point cloud and the semantic label information of the 2D image are retained, which provides more information for the 3D detection model and can improve the accuracy of object detection.

Figure 5:
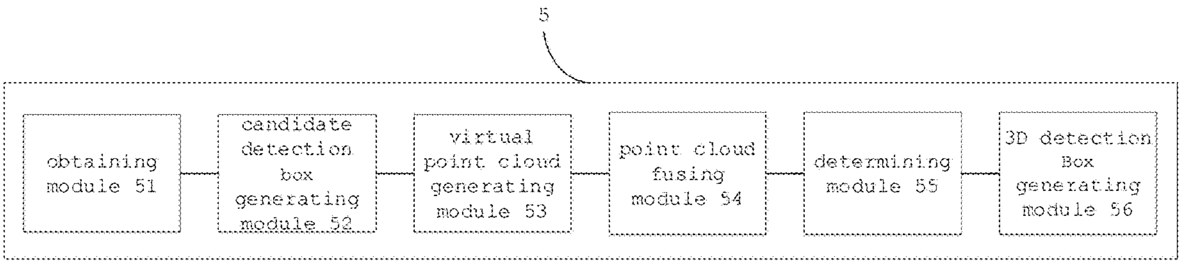
FIG. 5 shows a block diagram of an object detection apparatus according to some embodiments of the present disclosure.

FIG. 5 shows a block diagram of an object detection apparatus according to some embodiments of the present disclosure.

As shown in FIG. 5, the object detection apparatus 5 comprises an obtaining module 51, a candidate detection box generating module 52, a virtual point cloud generating module 53, a point cloud fusing module 54, a determining module 55 and a 3D detection box generating module 56.

The obtaining module 51 is configured for obtaining an original point cloud of an object to be detected, an image of the object to be detected, and semantic labels of pixels in the image, such as performing the step S1 as shown in FIG. 1.

The candidate detection box generating module 52 is configured for generating a candidate detection box of the object to be detected according to the original point cloud, such as performing the step S2 as shown in FIG. 1.

The virtual point cloud generating module 53 is configured for generating a virtual point cloud according to the candidate detection box, such as performing the step S3 as shown in FIG. 1.

The point cloud fusing module 54 is configured for fusing the original point cloud with the virtual point cloud to obtain a fused point cloud, such as performing the step S4 as shown in FIG. 1.

The determining module 55 is configured for determining a semantic label corresponding to each point in the fused point cloud by projecting the fused point cloud onto an image coordinate system, such as performing the step S5 as shown in FIG. 1.

The 3D detection box generating module 56 is configured for generating a 3D detection box for the object to be detected by using a 3D detection model according to the fused point cloud and the semantic label corresponding to each point in the fused point cloud, such as performing the step S6 as shown in FIG. 1.

The object detection apparatus according to the present disclosure, can solve the alignment problem between a 3D point cloud and a 2D image by projecting the point cloud onto an image coordinate system to determine the correspondence between the point in the point cloud and the semantic label of each point in the 2D image coordinate system.

Besides, the object detection apparatus according to the present disclosure only uses one 3D detection model, reducing the complexity of the model and facilitating deployment to the vehicle end. On the other hand, in the final data used for object detection, both the depth information of the 3D point cloud and the semantic label information of the 2D image are retained, which provides more information for the 3D detection model and can improve the accuracy of object detection.

Figure 6:
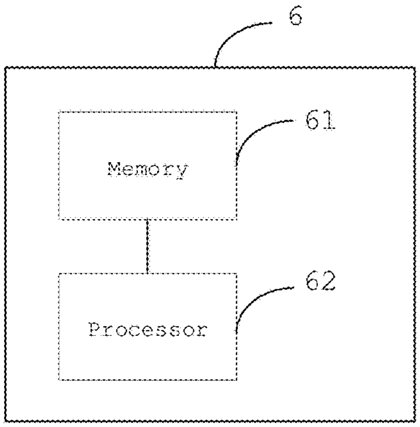
FIG. 6 shows a block diagram of an object detection apparatus according to some other embodiments of the present disclosure.

FIG. 6 shows a block diagram of an object detection apparatus according to some other embodiments of the present disclosure.

As shown in FIG. 6, the object detection apparatus 6 comprises a memory 61; and a processor 61 coupled to the memory 61, the memory 601 configured to store an instruction for implementing an embodiment corresponding to the object detection method. The processor 62 is configured to implement the object detection method in any of the embodiments of the present disclosure based on the instruction stored in the memory 61.

An embodiment of the present disclosure provides an unmanned vehicle, which is equipped with an object detection apparatus 5 or an object detection apparatus 6. According to the present disclosure, the accuracy of object detection can be improved, so that the unmanned vehicle can avoid an obstacle based on the detected object, thereby improving the running safety of the unmanned vehicle.

Figure 7:
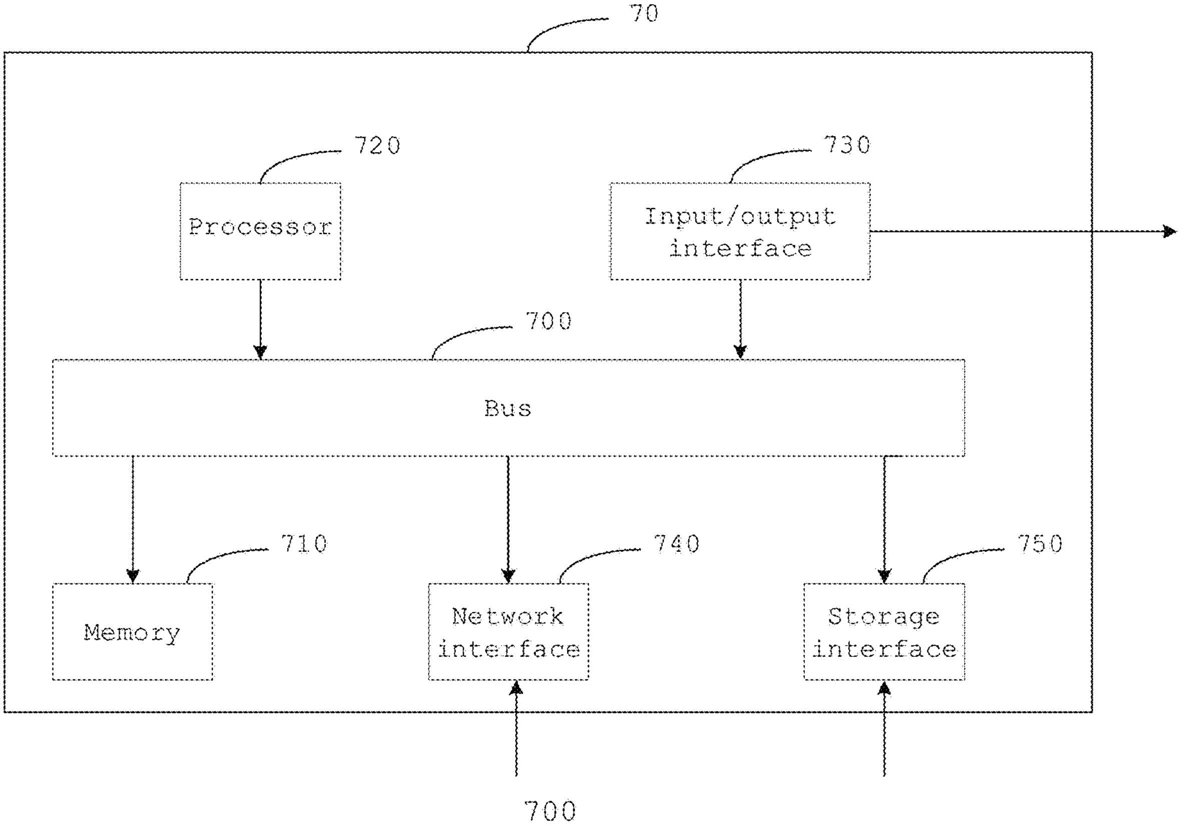
FIG. 7 shows a block diagram of a computer system for implementing some embodiments of the present disclosure.

FIG. 7 shows a block diagram of a computer system for implementing some embodiments of the present disclosure.

As shown in FIG. 7, the computer system 70 can be represented in the form of a general-purpose computing device. The computer system 70 comprises a memory 710, a processor 720 and a bus 700 connecting different system components.

The memory 710 comprises, for example, a system memory, a nonvolatile storage medium, and the like. The system memory stores, for example, an operating system, an application program, a Boot Loader program and other programs. The system memory may comprise volatile storage media such as a random access memory (RAM) and/or a cache memory. The nonvolatile storage medium stores, for example, an instruction for implementing an embodiment corresponding to at least one of the object detection methods. A non-volatile storage medium includes, but is not limited to, a disk storage, an optical storage, a flash memory, or the like.

The processor 720 can be realized in the form of a general processor, a digital signal processor (DSP), an application specific integrated circuit (ASIC), a field programmable gate array (FPGA) or any other programmable logic device, a discrete hardware component such as discrete gate or transistor. Accordingly, each module, such as the judging module and the determining module, can be realized by a central processing unit (CPU) running an instruction to execute corresponding steps in a memory, or by a dedicated circuit to execute corresponding steps.

The bus 700 may use any of a variety of bus structures. For example, the bus structure includes, but is not limited to, an Industry Standard Architecture (ISA) bus, a Microchannel Architecture (MCA) bus and a Peripheral Component Interconnection (PCI) bus.

The computer system 70 may further comprise an input/output interface 730, a network interface 740, a storage interface 750, and the like. These interfaces 730, 740, 750 and the memory 710 and the processor 720 can be connected through the bus 700. The input/output interface 730 can provide a connection interface for an input/output device such as a display, a mouse and a keyboard. The network interface 740 provides a connection interface for various networked devices. The storage interface 750 provides a connection interface for an external storage device such as a floppy disk, a USB flash drive or an SD card.

Various aspects of the present disclosure are described herein with reference to flowcharts and/or block diagrams of methods, devices and computer program products according to embodiments of the present disclosure. It should be understood that each block of the flowchart and/or block diagram, and combinations of blocks, can be implemented by computer-readable program instructions.

These computer-readable program instructions may be provided to a processor of a general-purpose computer, special-purpose computer or other programmable apparatus to produce a machine, such that the instructions, when executed through the processor, produce a device which implements functions specified in the flowchart and/or block diagram block or blocks.

These computer-readable program instructions may also be stored in a computer-readable memory that cause a computer to function in a particular manner to produce an article of manufacture, including instructions that implement the functions specified in the flowchart and/or block diagram block or blocks.

The present disclosure may take the form of an entirely hardware embodiment, an entirely software embodiment or an embodiment combining software and hardware aspects.

Through the object detection method and apparatus, computer-readable storage medium and unmanned vehicle in the above embodiments, the accuracy of object detection is improved.

So far, the object detection method and apparatus, computer-readable storage medium and unmanned vehicle according to the present disclosure have been described in detail. In order to avoid obscuring the concepts of the present disclosure, some details that are commonly known in the art have not been described. Those skilled in the art can fully understand how to implement the technical solutions disclosed here according to the above description.

What is claimed is:

1. An object detection method, comprising:

obtaining an original point cloud of an object to be detected, an image of the object to be detected, and semantic labels of pixels in the image;

generating a candidate detection box for the object to be detected according to the original point cloud;

generating a virtual point cloud according to the candidate detection box;

fusing the original point cloud and the virtual point cloud to obtain a fused point cloud;

determining a semantic label corresponding to each point in the fused point cloud by projecting the fused point cloud onto an image coordinate system; and generating a 3D detection box for the object to be detected by using a 3D detection model according to the fused point cloud and the semantic label corresponding to each point in the fused point cloud.

2. The object detection method according to claim 1, wherein the generating a virtual point cloud according to the candidate detection box, comprises:

generating a grid of the candidate detection box;

generating the virtual point cloud according to the grid of the candidate detection box.

3. The object detection method according to claim 2, wherein each point in the virtual point cloud corresponds to one grid of the candidate detection box, and the virtual point cloud has a density greater than that of the original point cloud.

4. The object detection method according to claim 1, wherein the determining a semantic label corresponding to each point in the fused point cloud by projecting the fused point cloud onto an image coordinate system, comprises:

determining a correspondence between each point in the fused point cloud and each pixel in the image by projecting the fused point cloud onto the image coordinate system; and determining the semantic label corresponding to each point in the fused point cloud, according to the correspondence between each point in the fused point cloud and each pixel in the image, and the semantic label of each pixel in the image.

5. The object detection method according to claim 1, wherein the fusing the original point cloud and the virtual point cloud to obtain a fused point cloud, comprises:

superimposing the original point cloud with the virtual point cloud to obtain the fused point cloud.

6. The object detection method according to claim 1, wherein the generating a 3D detection box for the object to be detected by using a 3D detection model according to the fused point cloud and the semantic label corresponding to each point in the fused point cloud, comprises:

concatenating coordinates of each point in the fused point cloud with the semantic label of the point, to obtain fused information of the point cloud and the image; and generating the 3D detection box by using the 3D detection model according to the fused information of the point cloud and the image.

7. The object detection method according to claim 6, wherein the concatenating coordinates of each point in the fused point cloud with the semantic label of the point, to obtain fused information of the point cloud and the image, comprises:

connecting in series the coordinates of each point in the fused point cloud and the semantic label of the point onto an array as the fused information of the point cloud and the image.

8. The object detection method according to claim 6, wherein the 3D detection model comprises a first feature extraction network and a first detection network, the generating a 3D detection box for the object to be detected by using a 3D detection model, according to the fused information of point cloud and image, comprises:

extracting features of the fused information of the point cloud and image by using the first feature extraction network;

generating the 3D detection box for the object to be detected by using the first detection network, according to the features of the fused information of the point cloud and image.

9. The object detection method according to claim 1, wherein the semantic label of a pixel in the image is a category of each pixel generated by semantic segmentation of the image.

10. The object detection method according to claim 1, wherein the original point cloud of the object to be detected is obtained by scanning the object to be detected with a lidar, and the image of the object to be detected is obtained by shooting the object to be detected with a camera.

11. The object detection method according to claim 1, wherein the generating a candidate detection box of the object to be detected according to the original point cloud, comprises:

extracting features of the original point cloud by using a second feature extraction network;

generating the candidate detection box of the object to be detected by using a second detection network, according to the features of the original point cloud.

12. An object detection apparatus, comprising:

a memory; and a processor coupled to the memory, the processor being configured to implement an object detection method comprising:

obtaining an original point cloud of an object to be detected, an image of the object to be detected, and semantic labels of pixels in the image;

generating a candidate detection box for the object to be detected according to the original point cloud;

generating a virtual point cloud according to the candidate detection box;

fusing the original point cloud and the virtual point cloud to obtain a fused point cloud;

determining a semantic label corresponding to each point in the fused point cloud by projecting the fused point cloud onto an image coordinate system; and generating a 3D detection box for the object to be detected by using a 3D detection model according to the fused point cloud and the semantic label corresponding to each point in the fused point cloud.

13. An unmanned vehicle equipped with the object detection apparatus according to claim 12.

14. The unmanned vehicle according to claim 13, further comprising at least one of a lidar or a camera, wherein the lidar is configured to scan an object to be detected to obtain an original point cloud of the object to be detected, and the camera is configured to shoot the object to be detected to obtain an image of the object to be detected.

15. The object detection apparatus according to claim 12, wherein the generating a virtual point cloud according to the candidate detection box, comprises:

generating a grid of the candidate detection box;

generating the virtual point cloud according to the grid of the candidate detection box.

16. The object detection apparatus according to claim 15, wherein each point in the virtual point cloud corresponds to one grid of the candidate detection box, and the virtual point cloud has a density greater than that of the original point cloud.

17. A non-transitory computer-readable storage medium, on which a computer program instruction is stored, and the computer program instruction, when executed by a processor, implements an object detection method comprising:

obtaining an original point cloud of an object to be detected, an image of the object to be detected, and semantic labels of pixels in the image;

generating a candidate detection box for the object to be detected according to the original point cloud;

generating a virtual point cloud according to the candidate detection box;

fusing the original point cloud and the virtual point cloud to obtain a fused point cloud;

determining a semantic label corresponding to each point in the fused point cloud by projecting the fused point cloud onto an image coordinate system; and generating a 3D detection box for the object to be detected by using a 3D detection model according to the fused point cloud and the semantic label corresponding to each point in the fused point cloud.

18. The non-transitory computer-readable storage medium according to claim 17, wherein the generating a virtual point cloud according to the candidate detection box, comprises:

generating a grid of the candidate detection box;

generating the virtual point cloud according to the grid of the candidate detection box.

19. The non-transitory computer-readable storage medium according to claim 18, wherein each point in the virtual point cloud corresponds to one grid of the candidate detection box, and the virtual point cloud has a density greater than that of the original point cloud.

* * * * *